US012771065B2

(12) United States Patent
Chen

(10) Patent No.: US 12,771,065 B2
(45) Date of Patent: Oct. 20, 2026

(54) FLOATING CONNECTOR AND CONTACT FOR SUCH A FLOATING CONNECTOR

(71) Applicant: P-TWO INDUSTRIES INC., Taoyuan City (TW)

(72) Inventor: Pi-Miao Chen, Taoyuan City (TW)

(73) Assignee: P-TWO INDUSTRIES INC., Taoyuan City (TW)

( * ) Notice: Subject to any disclaimer, the term of this patent is extended or adjusted under 35 U.S.C. 154(b) by 378 days.

(21) Appl. No.: 18/410,352

(22) Filed: Jan. 11, 2024

(65) Prior Publication Data

US 2025/0096504 A1 Mar. 20, 2025

(30) Foreign Application Priority Data

Sep. 14, 2023 (TW) ................................ 112135165

(51) Int. Cl.
*H01R 13/631* (2006.01)
*H01R 13/02* (2006.01)
*H01R 13/502* (2006.01)

(52) U.S. Cl.
CPC ......... *H01R 13/6315* (2013.01); *H01R 13/02* (2013.01); *H01R 13/502* (2013.01)

(58) Field of Classification Search
None
See application file for complete search history.

(56) References Cited

U.S. PATENT DOCUMENTS

2021/0376509 A1* 12/2021 Obata .................... H01R 43/16
2024/0283180 A1* 8/2024 Chen ...................... H01R 12/91

FOREIGN PATENT DOCUMENTS

| | | | |
|---|---|---|---|
| CN | 110416770 | A | 11/2019 |
| CN | 110416774 | A | 11/2019 |
| CN | 112670730 | A | 4/2021 |
| EP | 3796480 | A1 | 3/2021 |
| JP | 2007-220327 | A | 8/2007 |
| JP | 2020119637 | A | 8/2020 |
| TW | M654314 | B | 4/2024 |

* cited by examiner

*Primary Examiner* — Ross N Gushi

(74) *Attorney, Agent, or Firm* — MUNCY, GEISSLER, OLDS & LOWE, P.C.

(57) ABSTRACT

A floating connector and a contact for the floating connector are disclosed. The floating connector includes a stationary housing, a movable housing and a plurality of contacts. The stationary housing has an internal space opened upward, and at least one part of the movable housing is received in the internal space and freely movable with respect to the stationary housing. Each contact comprises: a soldered portion, a first held portion, a spring portion, a second held portion, a contact arm and a contact portion. The first held portion extends from the soldered portion and held by the stationary housing, the second held portion is held by the movable housing, and the first held portion and the second held portion are connected by the spring portion. The spring portion is formed with a plurality of elongated slots. With aid of the elongated slots, elastic deformation of the spring portion is facilitated.

9 Claims, 5 Drawing Sheets

FLOATING CONNECTOR AND CONTACT FOR SUCH A FLOATING CONNECTOR

CROSS-REFERENCE TO RELATED APPLICATIONS

This application claims the benefit of priority to Taiwanese Patent Application No. 112135165 filed on Sep. 14, 2023, which is hereby incorporated by reference in its entirety.

FIELD OF THE INVENTION

The present invention is related to a floating connector, particularly a floating connector for transmitting a large current.

DESCRIPTION OF THE PRIOR ART

To meet the demand for transmitting a power supply current, a power supply contact with a greater width compared to a signal contact is employed. However, in the case of using the wider power supply contact, the resistance to movement of the movable housing with respect to the stationary housing increases. This may cause problems in use.

Japanese Patent Publication No. 2007-220327A discloses a floating connector having a power supply contact. To address the aforementioned problem, it is proposed to use a power supply contact composed of a first contact and a second contact. By enabling relative movement between the first contact and the second contact, the problem of increased resistance mentioned above is prevented.

SUMMARY OF THE INVENTION

One object of the present invention is to provide a floating connector capable of absorbing an error of a mounting position of a connection object, thereby preventing damage to the connector or the connection object.

Another object of the present invention is to provide a floating connector for transmitting a large current, wherein each contact is capable of transmitting a current of up to 9 amperes.

According to one aspect of the present invention, a floating connector is provided, which includes: a stationary housing having an internal space opened upward; a movable housing having a fitting portion to be fitted with a connection object in a first direction, at least one part of the movable housing being received in the internal space and configured to be freely movable with respect to the stationary housing in a plane perpendicular to the first direction; and a plurality of contacts arranged along a second direction perpendicular to the first direction, each contact being formed by bending a flat elongated metal strip, each contact comprising: a soldered portion, a first held portion, a spring portion, a second held portion, a contact arm and a contact portion; wherein the soldered portion is located on a bottom surface of the stationary housing, the first held portion extends from the soldered portion and is held by the stationary housing, the second held portion is held by the movable housing, the first held portion and the second held portion are connected by the spring portion, the contact arm extends from the second held portion, the contact portion is formed on an end of the contact arm, the spring portion comprises: a first straight portion, a first bent portion, an intermediate portion, a second bent portion and a second straight portion, the first straight portion is connected to the first held portion, the second straight portion is connected to the second held portion, the intermediate portion is connected to the first straight portion via the first bent portion and is connected to the second straight portion via the second bent portion, the spring portion is formed with a plurality of first elongated slots and a plurality of second elongated slots, the first elongated slots extend over the first straight portion and the first bent portion and extend to the intermediate portion, the second elongated slots extend over the second straight portion and the second bent portion and extend to the intermediate portion, and in the intermediate portion, the first elongated slots and the second elongated slots are spaced from each other by a slot interruption.

According to the floating connector of the present invention, the contact portion is configured to be substantially U-shaped, V-shaped or L-shaped, and the contact portion is formed with a contact slot running parallel to a direction in which the contact arm extends.

According to the floating connector of the present invention, the slot interruption is formed with a positioning hole.

According to the floating connector of the present invention, the floating connector further comprises two fixing brackets which are affixed to two ends of the stationary housing respectively so that the movable housing is restricted to be movable in the plane perpendicular to the first direction.

According to the floating connector of the present invention, a length of the slot interruption in a lengthwise direction of the intermediate portion is between 0.25 times and 0.65 times of a length of the intermediate portion.

According to the floating connector of the present invention, a length of the slot interruption in a lengthwise direction of the intermediate portion is between 0.4 times and 0.5 times of a length of the intermediate portion.

According to another aspect of the present invention, a contact for a floating connector is provided, the floating connector comprising a stationary housing and a movable housing which is movable with respect to the stationary housing, the contact being formed by bending a flat elongated metal strip, the contact comprising: a soldered portion, a first held portion, a spring portion, a second held portion, a contact arm and a contact portion, wherein the first held portion extends from the soldered portion and is held by the stationary housing, the second held portion is held by the movable housing, the first held portion and the second held portion are connected by the spring portion, the contact arm extends from the second held portion, the contact portion is formed on an end of the contact arm, the spring portion comprises: a first straight portion, a first bent portion, an intermediate portion, a second bent portion and a second straight portion, the first straight portion is connected to the first held portion, the second straight portion is connected to the second held portion, the intermediate portion is connected to the first straight portion via the first bent portion and is connected to the second straight portion via the second bent portion, the spring portion is formed with a plurality of first elongated slots and a plurality of second elongated slots, the first elongated slots extend over the first straight portion and the first bent portion and extend to the intermediate portion, the second elongated slots extend over the second straight portion and the second bent portion and extend to the intermediate portion, and in the intermediate portion, the first elongated slots and the second elongated slots are spaced from each other by a slot interruption.

According to the contact of the present invention, the contact portion is configured to be substantially U-shaped, V-shaped or L-shaped, and the contact portion is formed with a contact slot running parallel to a direction in which the contact arm extends.

According to the contact of the present invention, the slot interruption is formed with a positioning hole.

According to the contact of the present invention, a length of the slot interruption in a lengthwise direction of the intermediate portion is between 0.25 times and 0.65 times of a length of the intermediate portion.

According to the contact of the present invention, a length of the slot interruption in a lengthwise direction of the intermediate portion is between 0.4 times and 0.5 times of a length of the intermediate portion.

The above and other objects and advantages of the present invention will become apparent from the accompanying drawings and the following detailed description.

DETAILED DESCRIPTION OF THE INVENTION

Figure 1:
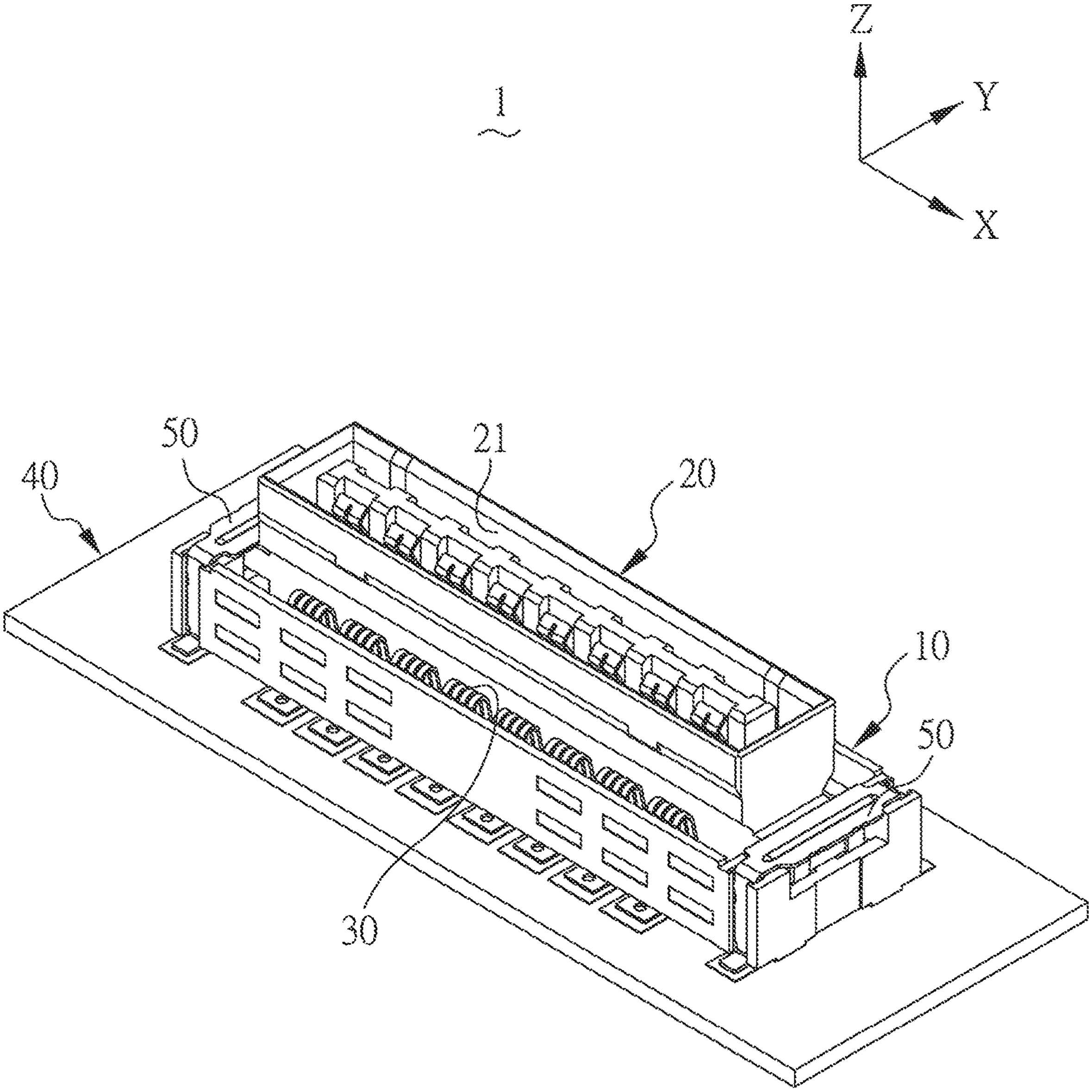
FIG. 1 is a perspective view of a floating connector according to the present invention when mounted on a substrate.

Before a floating connector according to the present invention is described in detail in embodiments, it should be noted that in the following description, similar components will be designated by the same reference numerals. Furthermore, the drawings of the present invention are for illustrative purposes only, they are not necessarily drawn to scale, and not all details are necessarily shown in the drawings.

Figure 2:
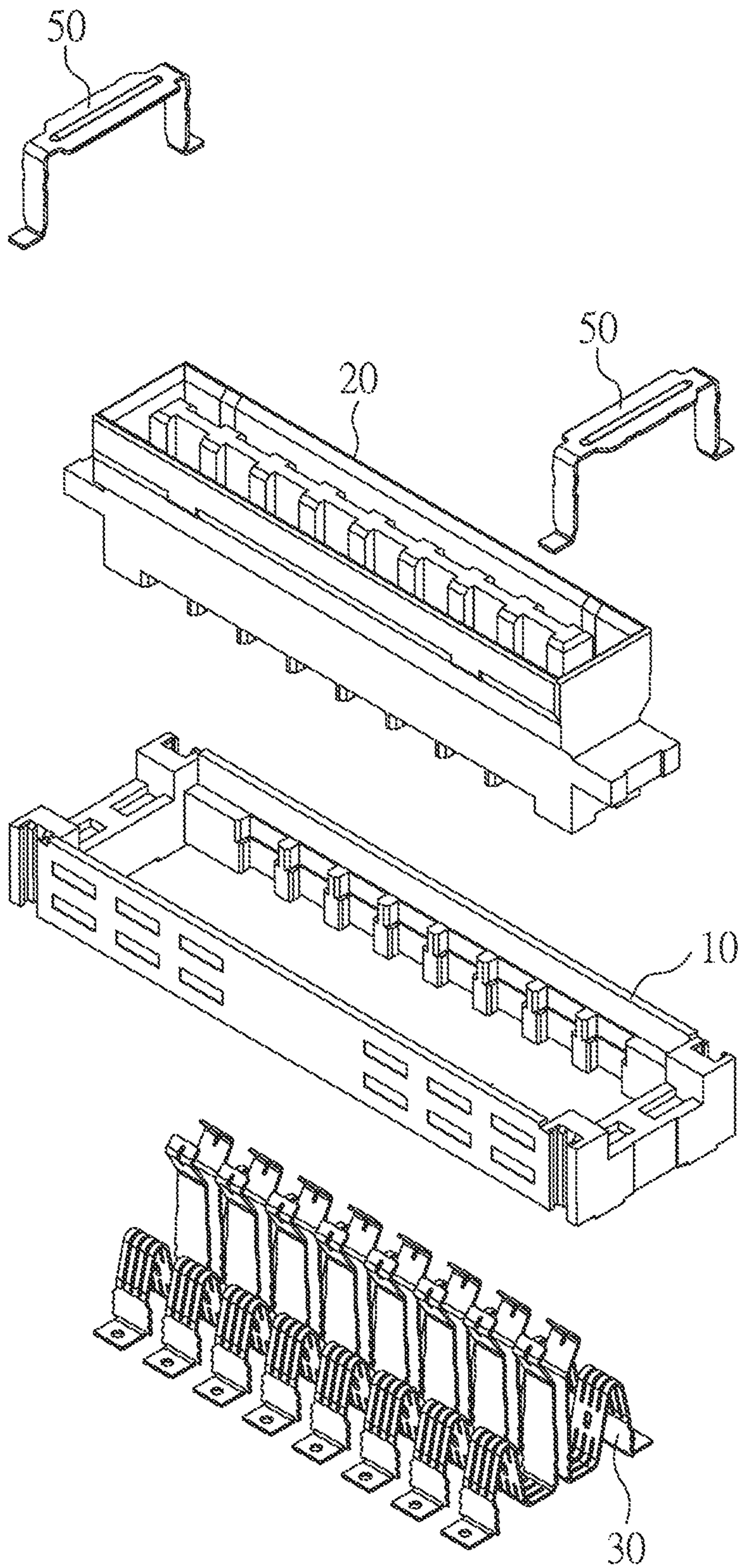
FIG. 2 is an exploded perspective view of the floating connector according to the present invention.

Reference is made to FIGS. 1 and 2, wherein FIG. 1 is a perspective view of a floating connector according to the present invention when mounted on a substrate, and FIG. 2 is an exploded perspective view of the floating connector according to the present invention. The floating connector is designated as a whole by the reference numeral "1". The floating connector 1 comprises a stationary housing 10, a movable housing 20, a plurality of contacts 30 and a pair of fixing brackets 50. The floating connector 1 is mounted on a substrate 40. In this embodiment, the floating connector 1 has sixteen contacts 30. Optionally, the number of the contacts can be increased or decreased.

The stationary housing 10 has an internal space opened upward. The movable housing 20 has a fitting portion 21 to be fitted with a connection object (not shown) in a first direction (Z axial direction). At least one part of the movable housing 20 is received in the internal space of the stationary housing 10. The external dimension of at least one part of the movable housing 20 and the internal dimension of the internal space of the stationary housing 10 are sized such that a certain gap exists between the movable housing 20 and the stationary housing 10, allowing the movable housing 20 to be freely movable in a plane (XY plane) perpendicular to the first direction. In a modification of this embodiment, the movable housing can be entirely received in the internal space of the stationary housing.

The pair of the fixing brackets 50 are affixed to two ends of the stationary housing 10, respectively. Each fixing bracket 50 is configured to be U-shaped and has a pair of parallel legs. Each parallel leg is formed with a barb structure and interferentially inserted into a groove or an opening formed on the stationary housing 10. Movement of the movable housing 20 in the first direction is stopped by the pair of the fixing brackets 50, and the movable housing 20 is prevented from being detached from the stationary housing 10. In such a manner, the movable housing 20 is restricted to be movable with respect to the stationary housing 10 in the plane (XY plane) perpendicular to the first direction. Ends of the pair of parallel legs are to be soldered to the pads formed on the substrate 40.

The contacts 30 are arranged in two rows along a second direction (X axial direction) perpendicular to the first direction, and one end of each contact 30 is to be soldered to the pad formed on the substrate 40.

Figure 3:
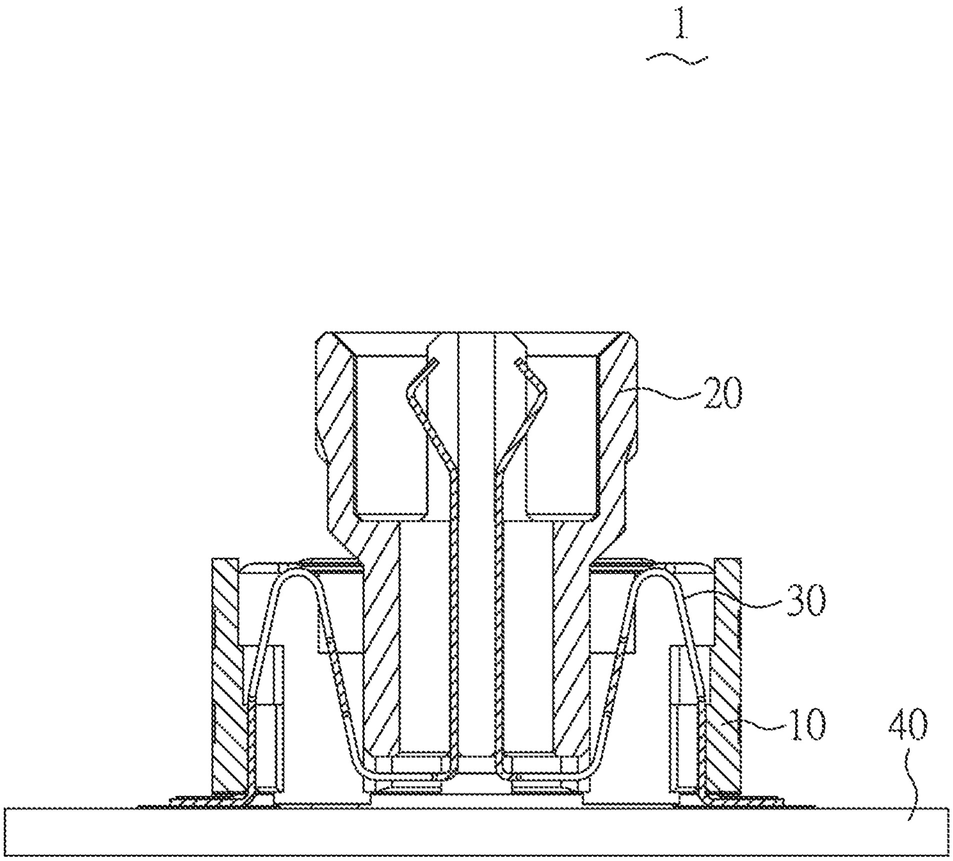
FIG. 3 is a cross sectional side view of the floating connector.

FIG. 3 is a cross sectional side view of the floating connector 1. As shown in FIG. 3, the movable housing 20 is supported by the contacts 30 in a floating manner with respect to the stationary housing 10.

Figure 4:
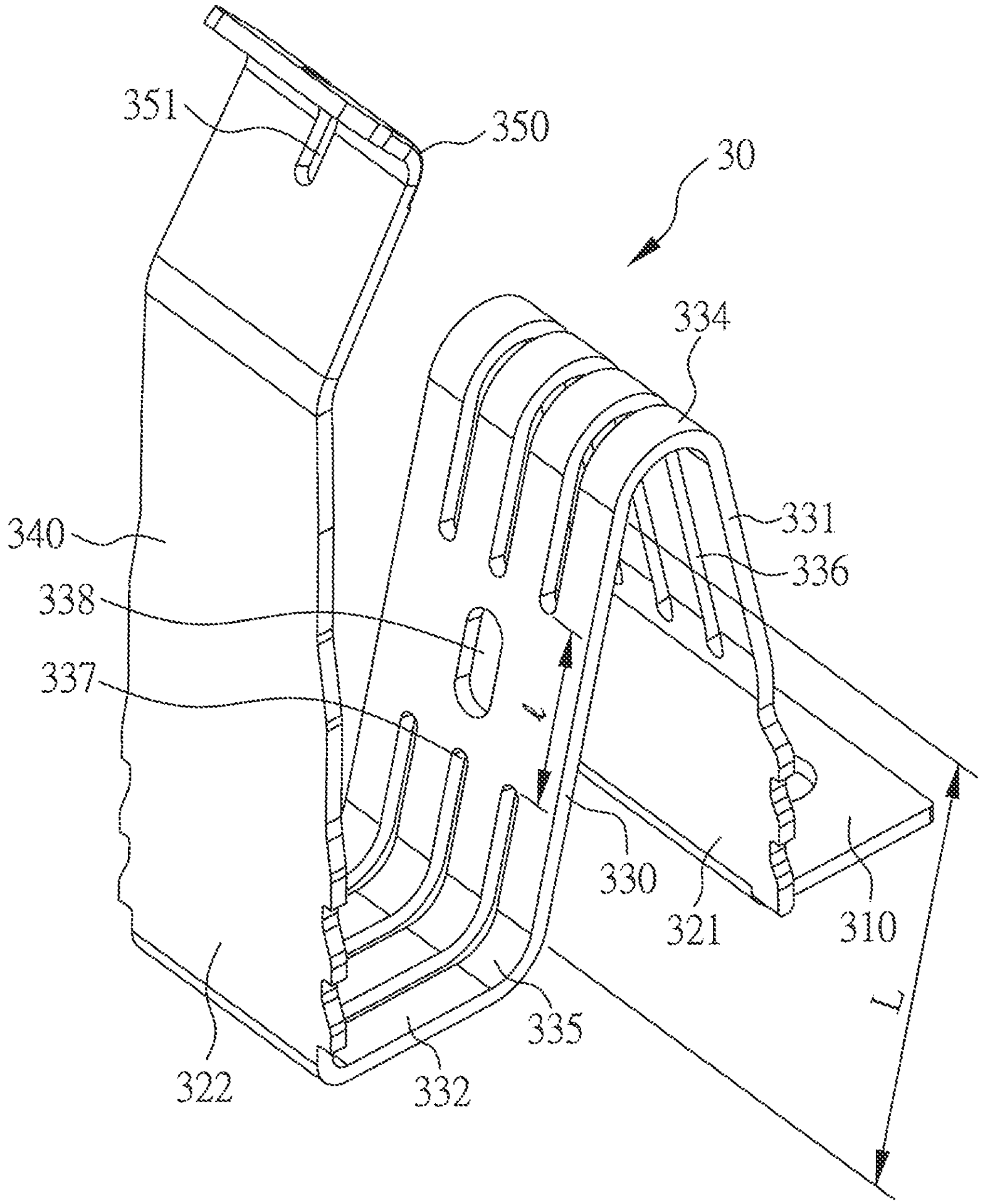
FIG. 4 is a perspective view of a contact.
Figure 5:
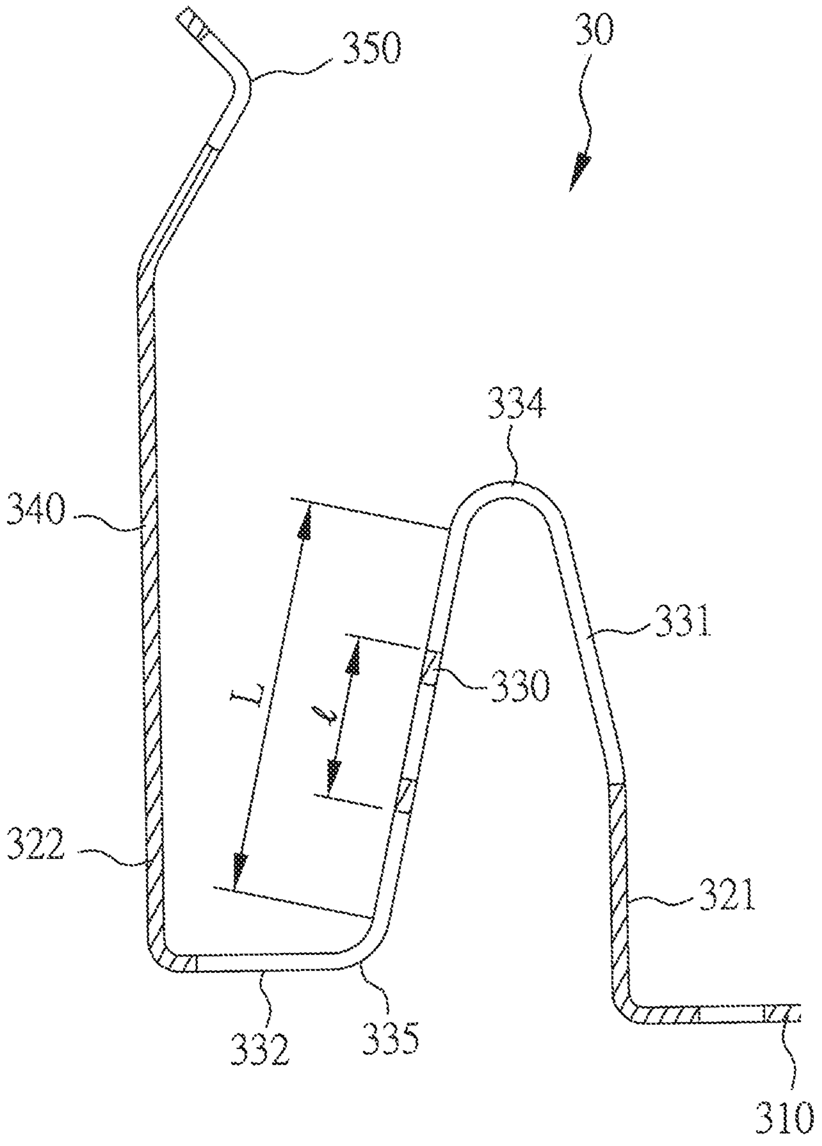
FIG. 5 is a cross sectional side view of the contact.

FIG. 4 is a perspective view of the contact. FIG. 5 is a cross sectional side view taken along a central line of the contact. In order to transmit a large current, a wider contact is used. The contact 30 is formed by bending an elongated flat metal strip. The elongated flat metal strip means that the contact has a width apparently greater than its thickness. In this embodiment, a ratio of the width of the contact 30 (particularly, the spring portion of the contact 30) to its thickness ranges from about 12 to about 16. However, the present invention is not limited hereto. In other modifications of the present invention, the ratio of the width of the contact (particularly, the spring portion of the contact) to its thickness is 7 or more.

The contact 30 comprises a soldered portion 310, a first held portion 321, a spring portion, a second held portion 322, a contact arm 340 and a contact portion 350 in this order. The spring portion comprises a first straight portion 331, a first bent portion 334, an intermediate portion 330, a second bent portion 335 and a second straight portion 332. The first straight portion 331 is connected to the first held portion 321, the second straight portion 332 is connected to the second held portion 322. The intermediate portion 330 is connected to the first straight portion 331 via the first bent portion 334 and is connected to the second straight portion 332 via the second bent portion 335.

The soldered portion 310 is located on a bottom surface of the stationary housing 10 and is to be soldered to the pad formed on the substrate 40. The first held portion 321 extends from the soldered portion 310. The first held portion 321 is formed with a barb structure and interferentially inserted into a groove or an opening formed on the stationary housing 10 so that the first held portion 321 is affixed to the stationary housing 10. Similarly, the second held portion 322 is formed with a barb structure and interferentially inserted into a groove or an opening formed on the movable housing 20 so that the second held portion 322 is affixed to the movable housing 20.

The first held portion 321 and the second held portion 322 are connected by the spring portion. The spring portion is formed with a plurality of first elongated slots 336 and a plurality of second elongated slots 337. The first elongated slots 336 extend over the first straight portion 331 and the first bent portion 334 and extend to the intermediate portion 330. The second elongated slots 337 extend over the second straight portion 332 and the second bent portion 335 and extend to the intermediate portion 330. In the intermediate portion 330, the first elongated slots 336 and the second elongated slots 337 are spaced from each other by a slot interruption. The slot interruption is formed with a positioning hole 338. The contact arm 340 extends from the second held portion 322, and the contact portion 350 is formed on an end of the contact arm 340.

In this embodiment, the contact portion 350 is configured to be substantially L-shaped, and the contact portion 350 is formed with a contact slot 351 parallel to a direction in which the contact arm 340 extends. The contact portion may be configured to be U-shape or V-shaped. Formation of the contact slot facilitates deformation of the contact portion 350. In the case that the contact of the floating connector of the present invention is oblique to the contact of the connection object, the contact portion 350 can be deformed compliantly so as to ensure a sufficient contact area between the contact of the floating connector and the contact of the connection object.

Using a wide contact brings the problem of increasing the resistance to movement of the movable housing with respect to the stationary housing. Therefore, the spring portion of the contact is partially weakened by forming the elongated slots in the spring portion so that elastic deformation of the spring portion is facilitated. In this way, the resistance to movement of the movable housing with respect to the stationary housing is reduced.

As compared with the contact where the elongated slots extends over the entire spring portion, the contact having the slot interruption in the intermediate portion of the spring portion has a more stable structure and does not tend to twist. Before bending a contact blank, the first elongated slots and the second elongated slots are formed by die cutting. The positioning hole 338 serves as means for positioning the contact blank when the contact blank is die-cut. The slot interruption allows formation of the position hole. Therefore, the contact having the slot interruption in the intermediate portion of the spring portion has better manufacturability. However, the present invention is not limited to the contact having the position hole in the slot interruption. In other modifications of the present invention, the slot interruption may has no positioning hole.

The length $\ell$ of the slot interruption 330 in a lengthwise direction of the intermediate portion 330 is between 0.25 times and 0.65 times of the length L of the intermediate portion 330, preferably between 0.4 times and 0.5 times of the length L of the intermediate portion 330. The ratio of the length $\ell$ to the length L can be expediently selected according to the result of the numerical simulation. The ratio of the length $\ell$ to the length L can also be determined according to the ratio of the width of the contact to the thickness of the contact, deformation amount of the contact, or movement amount of the movable housing. In principle, the portion (generally, a central portion of the spring portion) which bears less stress when the movable housing is moved with respect to the stationary housing may be formed with no elongated slot and hence may serve as a slot interruption. Alternatively, the elongated slots may be formed only in the portions (generally, the bent portions and the portions adjacent to the bent portions) which bear greater stress.

While this invention has been described in reference to a preferred embodiment, it should be understood that numerous changes and modifications could be made within the spirit and scope of the inventive concepts described. Accordingly, it is intended that the invention not be limited to the disclosed embodiment, but that it have the full scope permitted by the language of the following claims.

The invention claimed is:

1. A floating connector comprising:

a stationary housing having an internal space opened upward;

a movable housing having a fitting portion to be fitted with a connection object in a first direction, at least one part of the movable housing being received in the internal space and configured to be freely movable with respect to the stationary housing in a plane perpendicular to the first direction;

a plurality of contacts arranged along a second direction perpendicular to the first direction, each contact being formed by bending a flat elongated metal strip, each contact comprising: a soldered portion, a first held portion, a spring portion, a second held portion, a contact arm and a contact portion;

wherein the soldered portion is located on a bottom surface of the stationary housing, the first held portion extends from the soldered portion and is held by the stationary housing, the second held portion is held by the movable housing, the first held portion and the second held portion are connected by the spring portion, the contact arm extends from the second held portion, the contact portion is formed on an end of the contact arm, the spring portion comprises: a first straight portion, a first bent portion, an intermediate portion, a second bent portion and a second straight portion, the first straight portion is connected to the first held portion, the second straight portion is connected to the second held portion, the intermediate portion is connected to the first straight portion via the first bent portion and is connected to the second straight portion via the second bent portion, the spring portion is formed with a plurality of first elongated slots and a plurality of second elongated slots, the first elongated slots extend over the first straight portion and the first bent portion and extend to the intermediate portion, the second elongated slots extend over the second straight portion and the second bent portion and extend to the intermediate portion, and in the intermediate portion, the first elongated slots and the second elongated slots are spaced from each other by a slot interruption, wherein a length of the slot interruption in a lengthwise direction of the intermediate portion is between 0.25 times and 0.65 times of a length of the intermediate portion.

2. The floating connector of claim 1, wherein the contact portion is configured to be substantially U-shaped, V-shaped or L-shaped, and the contact portion is formed with a contact slot running parallel to a direction in which the contact arm extends.

3. The floating connector of claim 1, wherein the slot interruption is formed with a positioning hole.

4. The floating connector of claim 1, further comprising two fixing brackets which are affixed to two ends of the stationary housing respectively so that the movable housing is restricted to be movable in the plane perpendicular to the first direction.

5. The floating connector of claim 1, wherein a length of the slot interruption in a lengthwise direction of the intermediate portion is between 0.4 times and 0.5 times of a length of the intermediate portion.

6. A contact for a floating connector which comprises a stationary housing and a movable housing which is movable with respect to the stationary housing, the contact being formed by bending a flat elongated metal strip, the contact comprising: a soldered portion, a first held portion, a spring portion, a second held portion, a contact arm and a contact portion, wherein the first held portion extends from the soldered portion and is configured to be held by the stationary housing, the second held portion is configured to be held by the movable housing, the first held portion and the second held portion are connected by the spring portion, the contact arm extends from the second held portion, the contact portion is formed on an end of the contact arm, the spring portion comprises: a first straight portion, a first bent portion, an intermediate portion, a second bent portion and a second straight portion, the first straight portion is connected to the first held portion, the second straight portion is connected to the second held portion, the intermediate portion is connected to the first straight portion via the first bent portion and is connected to the second straight portion via the second bent portion, the spring portion is formed with a plurality of first elongated slots and a plurality of second elongated slots, the first elongated slots extend over the first straight portion and the first bent portion and extend to the intermediate portion, the second elongated slots extend over the second straight portion and the second bent portion and extend to the intermediate portion, and in the intermediate portion, the first elongated slots and the second elongated slots are spaced from each other by a slot interruption, wherein a length of the slot interruption in a lengthwise direction of the intermediate portion is between 0.25 times and 0.65 times of a length of the intermediate portion.

7. The contact of claim 6, wherein the contact portion is configured to be substantially U-shaped, V-shaped or L-shaped, and the contact portion is formed with a contact slot running parallel to a direction in which the contact arm extends.

8. The contact of claim 6, wherein the slot interruption is formed with a positioning hole.

9. The contact of claim 6, wherein a length of the slot interruption in a lengthwise direction of the intermediate portion is between 0.4 times and 0.5 times of a length of the intermediate portion.

* * * * *